United States Patent
Gleason et al.

[15] 3,662,578
[45] May 16, 1972

[54] TURBULENCE PROMOTER FORMATION

[72] Inventors: Thomas E. Gleason, Campbell; Charles C. Ripley, San Jose, both of Calif.

[73] Assignee: General Electric Company

[22] Filed: June 28, 1968

[21] Appl. No.: 741,073

[52] U.S. Cl. .................................72/75, 72/77, 72/367
[51] Int. Cl. .................................................B21d 13/04
[58] Field of Search ..................72/83, 100, 367, 370, 77, 75

[56] References Cited

UNITED STATES PATENTS

| 1,270,402 | 6/1918 | Fulton | 72/80 |
|---|---|---|---|
| 1,318,962 | 10/1919 | Brinkman | 72/75 |
| 2,385,498 | 9/1945 | Clifford | 72/100 |
| 2,779,223 | 1/1957 | Schuster | 72/100 |
| 3,434,321 | 3/1969 | Morgan | 72/83 |
| 1,778,181 | 10/1930 | Brinkman | 72/100 |

FOREIGN PATENTS OR APPLICATIONS 395,811  1/1966  Switzerland

*Primary Examiner*—Richard J. Herbst
*Attorney*—Ivor J. James, Jr., Samuel E. Turner, John R. Duncan, Frank L. Neuhauser, Oscar B. Waddell and Melvin M. Goldenberg

[57] ABSTRACT

A method and an apparatus for forming fluid turbulence promoters on the outer surface of tubes is disclosed. Typically, a set of hardened balls is pressed against the tube surface with sufficient force to deform the tube surface. Simultaneously, the balls and tube are moved relatively rotationally and longitudinally so that depressed grooves are formed in the tube surface. By varying the relative movement direction and speed and groove depth, a wide variety of groove patterns may be produced.

14 Claims, 7 Drawing Figures

3,662,578

PATENTED MAY 16 1972

INVENTORS:
THOMAS E. GLEASON
CHARLES C. RIPLEY

BY: *John R. Duncan*
ATTORNEY

TURBULENCE PROMOTER FORMATION

BACKGROUND OF THE INVENTION

It is well known that heat transfer between a solid member and a flowing fluid in contact therewith may be improved if the solid member has a roughened or finned surface. Such a surface both increases the heat transfer surface area and increases turbulence in the fluid layer adjacent the surface.

In certain applications, obtaining maximum heat transfer between a heated member and a flowing fluid is of the utmost importance. The removal of heat generated by nuclear fuel rods in a nuclear reactor is one such application.

Great difficulties are encountered in obtaining rapid and uniform heat transfer from a great many (often more than 1,000) fuel rods, which may have a length of over 10 feet and a diameter of less than 0.5 inch to the rapidly flowing fluid coolant stream. Prior techniques for forming turbulence promoters on fuel rods have not been adequate. Attaching separate fins to the rods has not proven practical where there is such a great number of rods in the reactor core. The turbulence promoters must generally not protrude excessively radially from the clad wall, since the space between fuel rods is very slight. Also, it is often desirable to vary the turbulence promoter characteristics along the length of the fuel rod and/or on groups of fuel rods in different locations in the core. Prior techniques do not permit this desired flexibility in design.

Welding of turbulence promoters to fuel rods is generally undesirable, since it deposits cast metal on a wrought metal surface and it may cause localized stresses and/or corrosion-susceptible areas which would result in rod failure in use. Also the cost and equipment complexity required to weld or otherwise fasten turbulence promoters to the rod surface is significant. Reproducibility and process control problems and difficulty in non-destructive inspection to assure required quality further hinder the use of the turbulence promoters of the prior art.

Thus, there is a continuing need for improvements in the formation of turbulence promoters on heat exchange surfaces; especially on nuclear reactor fuel rod surfaces for use in reactors.

SUMMARY OF THE INVENTION

It is, therefore, an object of this invention to provide a method and apparatus for forming turbulence promoters which overcomes the above-noted problems.

Another object of this invention is to provide a system for forming turbulence promoters which does not require heating of the surface.

Still another object of this invention is to provide a system of forming a wide variety of turbulence promoter patterns on a heat-exchange surface.

The above objects, and others, are accomplished in accordance with this invention, basically, by a system in which at least one ball member is brought into rolling pressure contact with the tube surface to depress the surface, then the ball and tube are moved relative to each other in both a rotational and an axial direction, whereby at least one groove is formed in the tube surface. An apparatus is provided which brings the ball into the desired pressure contact and controls the relative movement to produce the desired pattern. Ordinarily, several balls are used to simultaneously form a plurality of grooves. Where the tube is supported internally by a tight-fitting relatively incompressible mandrel, the tube inner diameter will not decrease, and slightly raised areas will be formed adjacent the grooves. Since the balls are always in rolling contact with the tube, they do not cut or gall the tube surface. Since the grooves are round-bottomed, rather than V-shaped as would occur with knurling tools, severe stress concentrations are avoided. In addition, the surface cold-working may improve the surface grain structure, leading to an improved corrosion resistance. Of course, any residual stresses resulting from the groove formation may be removed by conventional annealing, if desired.

This system is capable of generating a wide variety of turbulence promoter patterns and shapes. For example, moving the tube past the ball with simultaneous, continuous rotational and axial movement will produce spiral grooves. "Zig-zag" grooves are formed by alternating tube rotation in opposite directions during continuous axial tube movement through the ball tool. A diamond pattern may be formed by first forming right-hand spiral grooves, then feeding the tube through the tool to form left-hand grooves. Also, the shape of the grooves themselves may be varied easily. For example, flat-topped fins result from widely spaced grooves, while overlapping grooves produce sharp fins. A wide groove results from a large diameter ball and a narrow groove from a small diameter ball. Two or more balls may be used to form a single groove with a flatter bottom and steeper sides than if a single ball were used. As is further pointed out below, the spacing and depth of the grooves may be varied along the tube length, as desired. Many other variations on the above-described groove patterns and shapes will occur to those skilled in the art.

BRIEF DESCRIPTION OF THE DRAWING

Details of the turbulence promoter forming process and apparatus will be further understood upon reference to the drawing, wherein.

DETAILED DESCRIPTION OF THE INVENTION

Figure 1:
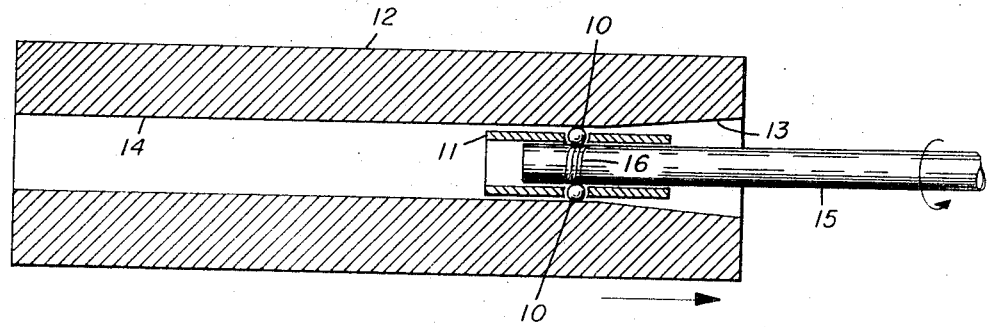
FIG. 1 is a simple schematic cut-away illustration of turbulence promoter formation according to this invention.

Referring now to FIG. 1, there is seen a schematic representation of a system for forming turbulence promoters by rolling balls under pressure against the surface of a tube.

A plurality of hardened balls 10 are loosely held within holes through the wall of a tubular ball shuttle 11. Shuttle 11 are adapted to move through a barrel 12 which has a generally conical entrance section 13 and a bore 14. Bore 14 has an internal diameter such that balls 10 are forced to project into the interior of shuttle 11 as shuttle 11 is moved through bore 14. When a tubular workpiece 15 is inserted into shuttle 11 and simultaneously rotated and moved longitudinally, a plurality of grooves 16 will be formed in the surface of workpiece 15. While it is possible to move workpiece 15 through the device by hand, it is preferred that these movements be mechanically controlled to permit the reproducible formation of uniform turbulence promoters. A conventional screw cutting lathe is capable of producing excellent results as the driving means for this system. Typically, workpiece 15 may be held in a lathe chuck and be rotated thereby. Barrel 12 may be secured to a longitudinally movable table driven by the lathe lead screw. Of course, a driving means could be constructed specifically to perform these functions in a similar manner.

The surface of balls 10 and barrel 12 should be very hard and pressure resistant. The surface characteristics of these two components should be similar, so that neither excessively wear the other. Balls 10 should have a surface hardness significantly greater than that of workpiece 15.

Typically, barrel 12 may comprise heat treated 4,340 tool steel. The inner surface of barrel 12 may be additionally hardened by techniques such as nitriding and/or hard chrome plating. Any suitable material may be used for balls 10. Typical materials include 52,100 heat treated steel or various sintered carbides. These materials are well suited for forming turbulence promoters on the surface of tubes comprising stainless steels, zirconium alloys, etc.

Preferably, at least three radially spaced balls are mounted in shuttle 11, to balance forces and maintain workpiece 15 in a centered position. If desired, additional balls may be used in one or more longitudinally spaced locations along shuttle 11. The balls may have any suitable diameter. As discussed above, for a given groove depth, larger balls will give wider grooves while smaller balls will give narrower, more steeply sided grooves.

The turbulence promoters may be formed to any suitable depth. In typical tubular nuclear reactor fuel cladding having an outside diameter of up to about 0.5 inch and a wall thickness of up to about 0.02 inch, groove depth is preferably in the range of about 0.0005 to about 0.004 inch. Optimum turbulence promotion, consistent with the maintenance of sufficient wall strength and corrosion resistance is obtained with grooves having a depth of from about 0.001 to about 0.0015 inch.

Often, it is desirable to form turbulence promoters over only a portion of a fuel rod. Also, it is generally undesirable to have sudden changes in heat transfer characteristics along a fuel rod. For example, it is generally undesirable to form turbulence promoters at the end of the fuel rod where the end plug is to be welded into place. Also, in a typical fuel rod for a fast steam cooled reactor the fuel rod may contain, in order, a fission gas plenum, a length containing fertile (blanket) material, an active fuel length and a second length containing fertile material. Substantially no heat need be transferred from the gas plenum length, and relatively little from the lengths containing fertile material, while most of the heat produced in the system must be transferred from the active fuel to the coolant circulating past the fuel rod. Thus, it may be desirable to have no turbulence promoters on the surface adjacent the gas plenum, with very efficient turbulence promoters adjacent the active fuel. Turbulence promoters of intermediate effectiveness would be desirable adjacent the fertile material. Also, it would be desirable to have a gradual change in heat transfer effectiveness at the transitions between these lengths, to prevent thermal stresses from concentrating at these boundaries.

With the system of this invention, the location and relative depth of turbulence promoters may be easily varied along the length of the fuel rod.

Location of turbulence promoters may be varied simply by inserting workpiece 15 through shuttle 11, with shuttle 11 located within conical entrance section 13 until the desired location is reached, then moving shuttle 11 so that balls 10 then begin to engage workpiece 15 and the walls of bore 14. The length of bore 14 determines the length of the turbulence promoter section.

Depth of the grooves 16 may be varied simply by varying the diameter of bore 14. If it is desired to gradually change from a smooth tube wall surface to a grooved surface, the diameter of bore 14 is merely designed to decrease from wide to narrow. Different turbulence promoter patterns may also be used along different portions of the workpiece.

Figure 2:
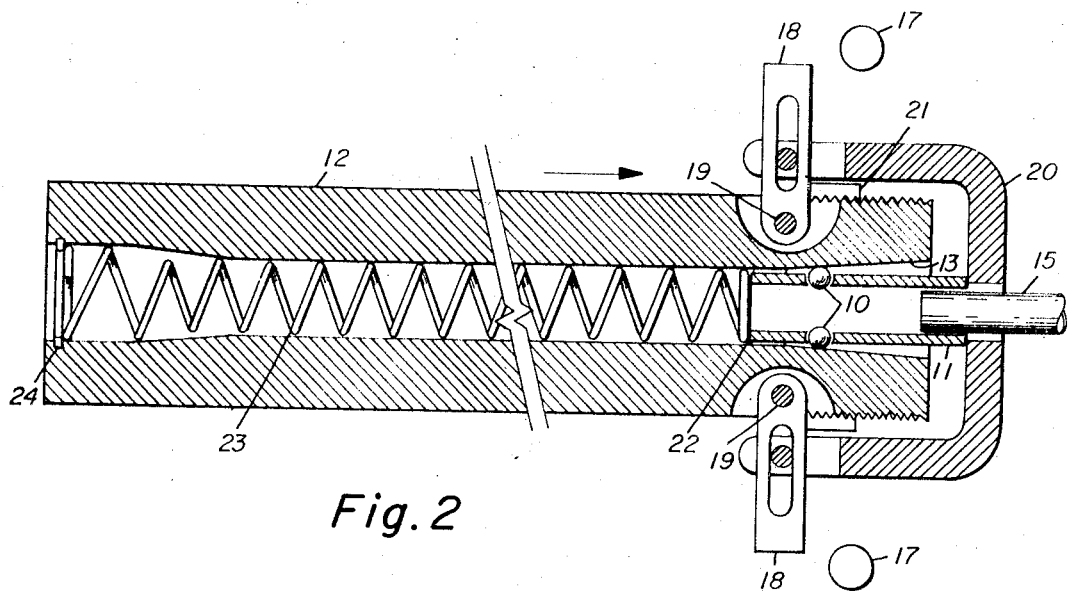
FIG. 2 is a sectional view through a tool adapted to automatically form turbulence promoters.

FIG. 2 shows a preferred embodiment of a tool for forming turbulence promoters according to the system of this invention. Basically, this tool includes a barrel 12 with a ball carrying shuttle 11 the for movement through a bore 14 therein.

Conically tapered inlet 13 and outlet 16 are provided so that the turbulence promoters will have gradual introductory section at each end. Bore 14 has a length substantially equal to the length along the workpiece which is to be grooved.

A tubular workpiece 15 is mounted on a rotating means (such as a lathe chuck) and introduced into shuttle 11. The position along the workpiece surface at which it is desired that the turbulence promoter start is positioned substantially on a line between stationary upstanding pins 17. Barrel 12 is mounted on a longitudinally movable means, (such as a lathe table driven by the lathe lead screw) for movement toward the workpiece. As barrel 12 moves to the right (as seen in FIG. 2), lever arms 18 contact stationary pins 17. As levers 18 turn about pivots 19, they force positive start means 20 to the left, moving shuttle 11 to the left. Balls 10 roll down conical surface 13 and come into engagement with the workpiece. Shuttle 11 then moves down bore 14, with balls 10 rolling between bore 14 and the workpiece, forming grooves in the workpiece surface. When lever 18 pass stationary pins 17, they return to the initial position. Levers 18 may be spring loaded into position abutting adjusting ring 21 which is threaded onto barrel 12. Adjusting ring 21 is easily located in different positions to accommodate different shuttles and ball arrangements. A ring of low friction material 22 such as a tetrafluoroethylene polymer, may be included to help guide shuttle 11 along bore 14. A spring 23 may be included within bore 14, supported by retaining ring 24, to aid in returning shuttle 11 to the starting position after workpiece 15 has passed through shuttle 11 and outlet 16.

While workpiece tube 15 may have turbulence promoters formed by this system without internal support, it is preferred that a tight-fitting mandrel be inserted in the tube during the ball rolling action. Such an arrangement is illustrated in FIG. 3.

Figure 3:
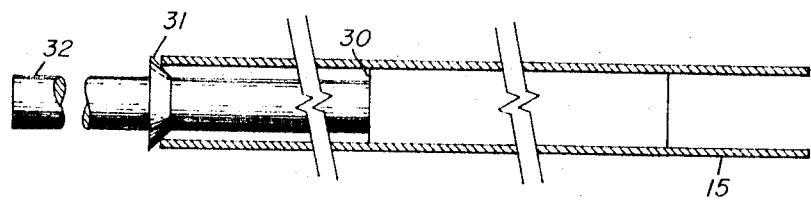
FIG. 3 is a sectional view illustrating the use of an internal mandrel within the tube on which turbulence promoters are to be formed.

As seen in FIG. 3, the mandrel includes a portion 30 which fits snugly within workpiece 15. This support is necessary only over the area to be shaped. A collar 31 serves to locate the expanded portion 30 at the desired level. A handle 32 is provided for insertion of the mandrel. In operation, the workpiece and mandrel are inserted within a tool such as that shown in FIG. 2 until the beginning of the portion of the rolled is adjacent pins 17. The mandrel is inserted through the open end of bore 14 until the leading end of expanded portion 30 reaches the location within workpiece 15 adjacent pins 17. The length of expanded portion equals the length of workpiece 15 to be rolled. Handle 32 must have a length sufficient to extend beyond the tool with the mandrel in position. The use of such a mandrel is preferred where the tube is to be filled with nuclear fuel pellets, since it maintains the internal diameter of the tube substantially uniform in rolled and unrolled sections. However, where the workpiece when rolled has already been filled with fuel material, or where slight decrease in tube internal diameter is acceptable, the mandrel may be omitted.

FIGS. 4-7 illustrate four of the many turbulence promoter patterns which may be formed by the technique of this invention.

Figure 4:
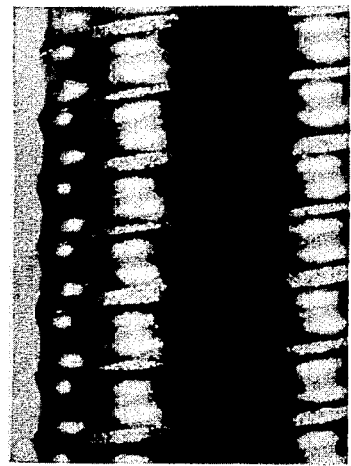

FIG. 4 is a reproduction of a photograph of turbulence promoters formed by rotating a plurality of balls in a single direction while advancing the tool. A "threaded" pattern results. By varying the number of balls, the rate of workpiece rotation and rate of tool advance the pattern may be varied. The raised portions between grooves may be relatively broad and flat-topped, or thin and sharp, or alternatively broad and narrow.

Figure 5:
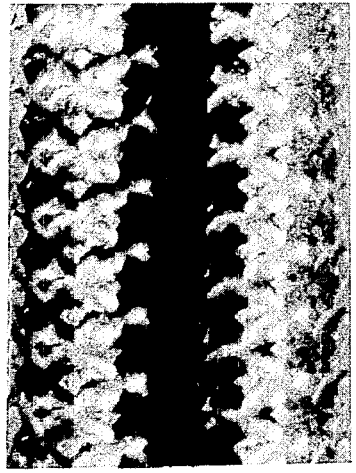
FIGS. 4–7 are reproductions of photographs of various typical turbulence promoter patterns which may be produced by the technique of this invention.

FIG. 5 illustrates a pattern formed by first forming a "threaded" pattern as seen in FIG. 4, then re-rolling the workpiece while rotating the workpiece in the opposite direction. This forms raised portions having a "diamond" shape. Again, the pattern may be varied by varying the system parameters, as discussed above.

Figure 6:

FIG. 6 illustrates a "zig-zag" pattern obtained by rotating the workpiece back and forth while advancing the tool. This results in a pattern having spaced wide raised portions separated by narrow ribs.

Figure 7:
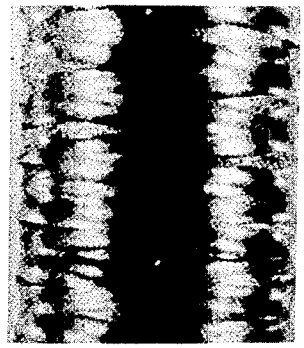

FIG. 7 illustrates a pattern formed in the same general manner as the "diamond" pattern of FIG. 5. Here, however, the pitch of the "threads" formed during the two passes in each rotational direction is much lower. Instead of "diamond" shaped raised portions, many thin, sharp raised fins are formed. These fins give especially high turbulence and heat transfer to a coolant passing at high velocity adjacent a fuel rod having this pattern. Also, there is no tendency for this pattern to force the coolant flow into a spiral path, as may occur with a closely spaced single "threaded" pattern. The pattern of FIG. 7 is, therefore, a preferred pattern for use on fuel rods.

As is apparent from the photographic illustrations in FIGS. 4–7, the turbulence promoters produced by the technique of this invention have round-bottomed depressed areas, thus preventing concentrations of stress in thin wall tube areas, while having relatively sharp-edged raised portions, thus maximizing turbulence and heat transfer of a passing coolant.

While specific materials, components and turbulence promoter patterns have been described above in conjunction with preferred embodiments, other components, materials and patterns may be used where suitable with similar results.

Other modifications and ramifications of the present invention will occur to those skilled in the art upon reading the present disclosure. These are intended to be included within the scope of this invention.

We claim:

1. A method of forming heat exchange turbulence promoters on the external surface of a tube which comprises providing a tubular ball shuttle in a barrel, the tubular ball shuttle having an opening holding at least one ball member of a size capable of producing grooves on the external surface of the tube when the balls are in rolling pressure contact with the surface, embossing the external surface of the tube with the at least one ball member through a rolling pressure contact with the external surface of said tube within the barrel; and causing simultaneous relative rotational and longitudinal movement between said at least one ball as positioned in said barrel and said tube, whereby at least one depressed groove is formed in the surface of said tube.

2. The method of claim 1 further including supporting said tube on a tightly fitting substantially incompressible mandrel during said rolling operation.

3. The method of claim 1 wherein said tube is continuously rotated in one direction and moved longitudinally relative to said one ball whereby at least one continuous spiral groove is formed in said tube surface.

4. The method of claim 1 wherein said tube is continuously moved longitudinally relative to said at least one ball while said tube is moved rotationally back and forth relative to said at least one ball, whereby a zig-zag groove pattern is produced on the surface of said tube.

5. The method of claim 1 wherein the depth of said grooves is varied over the groove length.

6. The method of claim 1 wherein the rate of relative rotation is sufficient that only a relatively sharp edge upstanding fin is left between grooves.

7. The method of claim 6 further including repeating said relative movement with a grooved tube while said rotation is maintained in the opposite direction, whereby a plurality of spaced sharp-edged upstanding fin areas are produced between grooves.

8. The method of claim 1 wherein said tube has a diameter of up to about 0.5 inch, a wall thickness of up to about 0.02 inch and said at least one groove is formed to a depth of from about 0.0005 to about 0.0004 inch.

9. The method of claim 8 wherein said at least one groove is formed to a depth of from about 0.001 to about 0.0015 inch.

10. An apparatus for forming heat exchange turbulence promoters on the external surface of a tube which comprises:
 a. a barrel having a bore of circular cross-section therethrough and an entrance section of expanding diameter;
 b. a shuttle tube having an outside diameter adapted to fit through said bore and a plurality of spaced holes substantially on a plane perpendicular to the axis of said tube;
 c. a plurality of balls in said holes, the balls having a size capable of producing grooves when in pressure contact with a surface sufficient to emboss the surface and the balls being adapted to roll against said bore and project into said shuttle tube when said shuttle tube is in said bore; and
 d. said shuttle tube adapted to receive a workpiece tube in embossing contact with said balls while said shuttle is in said bore.

11. The apparatus of claim 10 further including means to simultaneously rotate a workpiece tube and to move said workpiece tube longitudinally relative to said balls within said bore, whereby at least one groove is formed in the workpiece tube surface.

12. The apparatus of claim 10 further including means to move said shuttle tube from said entrance section into said bore while a workpiece tube is located within said shuttle tube.

13. The apparatus of claim 10 further including a substantially incompressible mandrel adapted to tightly fit within a workpiece tube within said shuttle tube.

14. The apparatus of claim 10 wherein said bore and said balls have substantially equal surface hardness, and said ball surface is substantially harder than the surface of said workpiece tube.

* * * * *

UNITED STATES PATENT OFFICE
CERTIFICATE OF CORRECTION

Patent No. 3,662,578                  Dated    May 16, 1972

Inventor(s) Thomas E. Gleason and Charles C. Ripley

It is certified that error appears in the above-identified patent and that said Letters Patent are hereby corrected as shown below:

Column 2, line 47, "are" should be --is--; and line 67, "wear" should be --wears--. Column 3, line 63, "the" should be --positioned--. Column 4, line 7, "lever" should be --levers--; line 27, "level" should be --location--; and line 30, "portion of the" should be --portion to be--. Column 5, line 6, "of" should be --to--.

Signed and sealed this 17th day of October 1972.

(SEAL)
Attest:

EDWARD M. FLETCHER, JR.            ROBERT GOTTSCHALK
Attesting Officer                   Commissioner of Patents